United States Patent
Demelas

(10) Patent No.: US 10,543,928 B2
(45) Date of Patent: Jan. 28, 2020

(54) ELECTRIC POWER DISTRIBUTION SYSTEM FOR AN AIRCRAFT

(71) Applicant: AIRBUS OPERATIONS, S.L., Getafe (Madrid) (ES)

(72) Inventor: Salvatore Demelas, Getafe (ES)

(73) Assignee: AIRBUS OPERATIONS, S.L., Getafe (Madrid) (ES)

( * ) Notice: Subject to any disclaimer, the term of this patent is extended or adjusted under 35 U.S.C. 154(b) by 164 days.

(21) Appl. No.: 15/349,180

(22) Filed: Nov. 11, 2016

(65) Prior Publication Data

US 2017/0137143 A1 May 18, 2017

(30) Foreign Application Priority Data

Nov. 15, 2015 (EP) .................................... 15382561

(51) Int. Cl.
*B64D 33/00* (2006.01)
*B64D 31/00* (2006.01)

(52) U.S. Cl.
CPC ............. *B64D 33/00* (2013.01); *B64D 31/00* (2013.01); *B64D 2221/00* (2013.01)

(58) Field of Classification Search
None
See application file for complete search history.

(56) References Cited

U.S. PATENT DOCUMENTS

| | | | | |
|---|---|---|---|---|
| 5,077,485 A | * | 12/1991 | Rashid | ...................... H02J 3/46 307/57 |
| 2006/0108882 A1 | * | 5/2006 | Michalko | ............... H02K 7/003 310/83 |
| 2013/0310994 A1 | | 11/2013 | Schroeter | |

OTHER PUBLICATIONS

European International Search Report; dated Mar. 2, 2016; 7 Pages.

* cited by examiner

*Primary Examiner* — Thienvu V Tran
*Assistant Examiner* — David M Stables

(57) ABSTRACT

An electric power distribution system for an aircraft is provided, which includes an engine gearbox, a power distribution center, two or more three-phase synchronous electric power generators, a neutral current transformer per generator, a single set of power feeder wires, and a single generator control unit (GCU). The generators are connected in parallel with each other, and connected with the power distribution center by the same set of power feeder wires. The GCU is electrically coupled with each generator to feed the generator with an excitation field current, and with each neutral current transformer to sense an instantaneous neutral-current value. The GCU is adapted to perform a generator voltage regulation loop based on a desired voltage value and the at least two sensed instantaneous neutral-current values by individually modifying the excitation field current of each generator.

13 Claims, 4 Drawing Sheets

ELECTRIC POWER DISTRIBUTION SYSTEM FOR AN AIRCRAFT

CROSS-REFERENCE TO RELATED APPLICATIONS

The present disclosure claims priority to European Application No. 15382561.7 filed on Nov. 11, 2015, which is hereby incorporated by reference in its entirety, as though set forth fully herein.

FIELD OF DISCLOSURE

The present disclosure refers to a new electric power distribution system for an aircraft, and in particular, for those aircrafts with multiple electrical generators powered by the same engine gearbox, and with electric power distribution architecture using a dedicated set of power feeder wires between each electrical power generator, and the power distribution center of the aircraft.

An object of the present disclosure is to provide an electric power distribution system that minimizes the weight of conventional electric power distribution systems and, at the same time, that simplifies the link between the electrical power generators of the engine and the power distribution center of the aircraft.

Another object of the present disclosure is to provide an electric power distribution system that reduces the number of generator control units (GCU) required for the engine to supply electric power to the aircraft, allowing saving costs and space when installed in the aircraft.

BACKGROUND OF THE DISCLOSURE

The auxiliary power unit (APU) is a gas turbine engine that supplies electrical and pneumatic power to the aircraft systems as an auxiliary or secondary source of power. The APU allows the aircraft to be autonomous of external electric and pneumatic power sources on ground and in-flight.

The gearbox of the APU transfers power from the engine to electric power generators. These generators supply electric power to the power distribution center of the aircraft. The APU turbomachinery is mounted in a dedicated fire compartment in the tail cone of the aircraft, the APU compartment, while the power distribution center is traditionally installed in the nose section.

To meet the aircraft power needs, in some of the current designs, the APU turbomachine drives two electric power generators. These two generators operate as two independent power sources, so that the control and distribution of these conventional electric power distribution systems is fully duplicated. Thus, current electric power distribution systems include two sets of power feeder wires for connecting each generator with the power distribution center, and two generator control units, one generator control unit for each electric power generator.

As shown in FIG. 1, a conventional electric power distribution system includes an engine gearbox (2), a power distribution center (6), two or more three-phase electrical power generators (3) for being driven by the engine gearbox (2), and one generator control unit (7) for each generator (3). The electrical power generators (3) provide power to the power distribution center (6). Each generator control unit (7) is connected to each one of the generators (3) for calculating and providing the excitation current required for the generator (3) to reach a desired generated voltage. This way, conventional architectures maintain the system in a balance condition, where each electric power generator supplies same voltage to the power distribution center.

However, these conventional systems provide duplicated elements, such as generator control units and sets of power feeder wires, which entail a more complicated electric power distribution architecture, and at the same time that increase the cost and weight of the system.

Therefore, it would be desirable to provide an improved electric power distribution system that simplify conventional electric power distribution systems, and at the same time that reduce the associated weight while maximizing commonality and allow for reuse of components from the electrical architecture on existing aircrafts. Also, it would be desirable to reduce the cost associated to traditional electric power distribution systems.

Additionally, it would be desirable to extend these technical means to all aircraft engines, such as the main engines or the APU.

SUMMARY OF THE DISCLOSURE

The present disclosure overcomes the above-mentioned drawbacks by providing an improved electric power distribution system, which simplifies conventional electric power distribution systems, and at the same time that achieves a weight and cost reduction.

An aspect of the present disclosure refers to an electric power distribution system for an aircraft that includes an engine gearbox, a power distribution center, two or more three-phase synchronous electric power generators, and two or more neutral current transformers. The generators are adapted to be driven by the engine gearbox, and supply electric power to the distribution center. The neutral current transformers are connected respectively to each one of the electric power generators. According to an aspect of the present disclosure, the generators are electrically connected in parallel with each other. Further, the system includes a set of power feeder wires, where the two electric power generators are connected with the set of power feeder wires for simultaneously supplying electric power to the power distribution center through the same set of power feeder wires. Additionally, the system of the present disclosure includes a generator control unit electrically coupled with each one of the electric power generators to individually feed each generator with an excitation field current. The generator control unit is electrically coupled with the two neutral current transformer of each generator, and the generator control unit is adapted for sensing an instantaneous neutral-current value of each generator. Also, the generator control unit is adapted to perform a generator voltage regulation loop based on a desired voltage value and the two sensed instantaneous neutral-current values of the two generators, by individually modifying the excitation field current of each generator, to ensure that both generators are balanced and generate substantially the same voltage.

By connecting the electric power generators in parallel with each other, and providing the generator control unit with the connections and configuration required to maintain said generators producing the same voltage, the system only requires extending a single set of power feeder wires towards the power distribution center.

For that, the generator control unit is both electrically coupled with each generator for sensing the instantaneous neutral-current value of each generator, and adapted to implement a voltage regulation loop based on a desired voltage value and the sensed instantaneous neutral-current.

Since the electric power generators are connected in parallel, the system of the invention only requires the use of a single set of power feeder wires between the electric power generators and the electric power to the distribution center. Since the electric power generators are mounted in the tail cone and/or in the wings of the aircraft, and the power distribution center is installed in the nose section, the system reduces the number of wires crossing the whole length or a large part of the aircraft. Thus, the system of the present disclosure achieves to simplify the electric power distribution system.

Further, by the removal of a dedicated link between each generator of the auxiliary power unit compartment and the power distribution center of the aircraft, and of the associated installation components of the dedicated links, the system of the present disclosure allows reducing installation, recurrent and direct maintenance costs.

Additionally, the system achieves a significant weight reduction by dispensing with a dedicated link per each generator of the engine and the power distribution center.

Moreover, by providing an electric power distribution system that only requires one set of power feeder wires from the engine compartment and the power distribution center, the system of the present disclosure enables saving space. As a result, extra room for either harness routing for any other new or existing aircraft system, or placing any new or existing aircraft equipment's, is provided.

BRIEF DESCRIPTION OF THE FIGURES

For a better comprehension of the invention, the following drawings are provided for illustrative and non-limiting purposes, wherein.

DETAILED DESCRIPTION OF THE PRESENT DISCLOSURE

Figure 2:
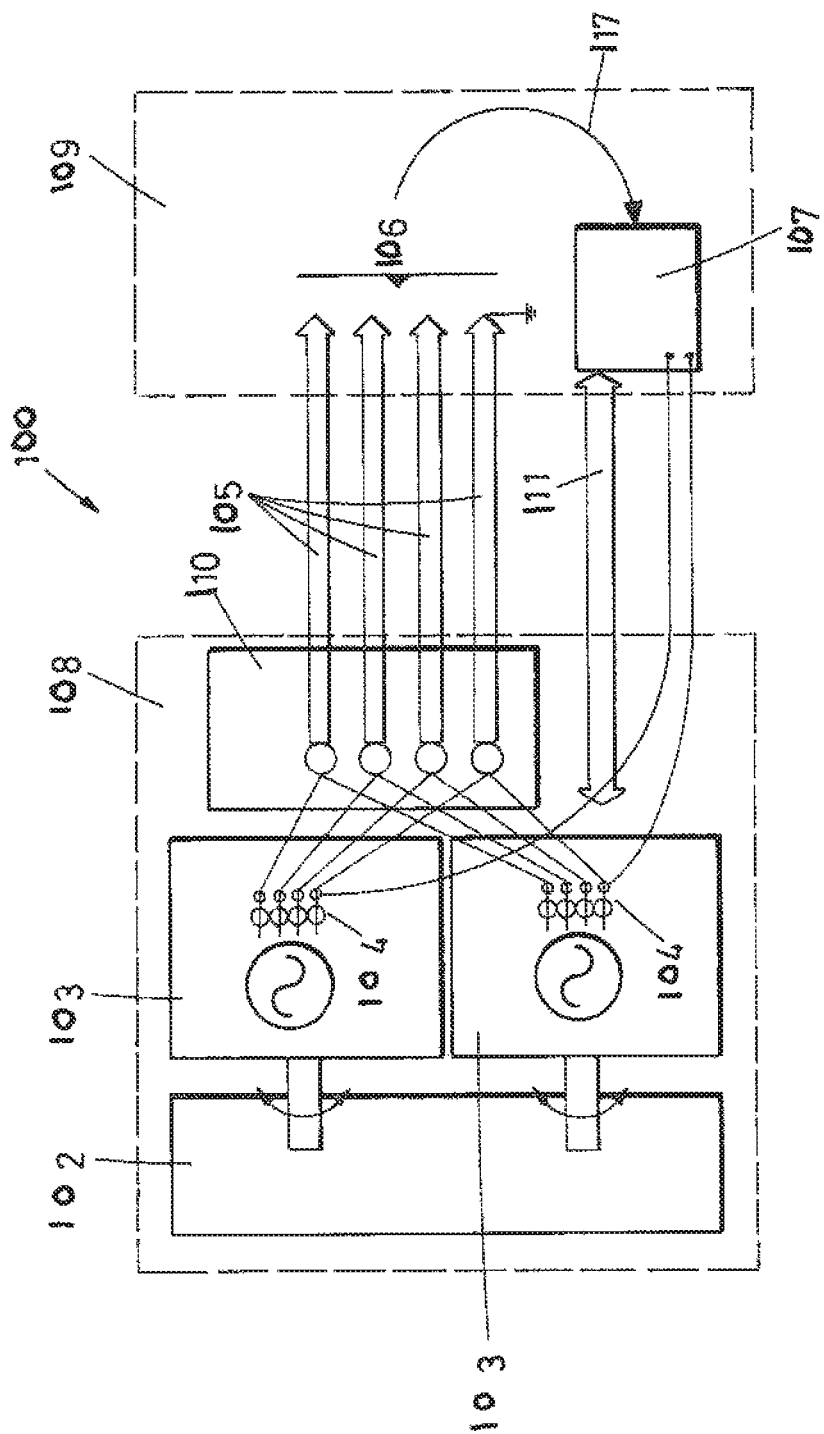
FIG. 2 is a schematic view of an electric power distribution system in accordance with an aspect of the present disclosure.

FIG. 2 shows a schematic view of an electric power distribution system 100 for an aircraft, where the engine is an APU. As conventionally, the electric power distribution system 100 of FIG. 2 comprises an APU gearbox 102, a power distribution center 106, two or more three-phase synchronous electric power generators 103 adapted to be driven by the APU gearbox 102 and supply electric power to the distribution center 106, and two or more neutral current transformers 104 connected respectively to each one of the electric power generators 103. Also, as conventionally, the electric power distribution system 100 include a set of power feeder wires 105 to conduct the electric power generated to the power distribution center 106, and a generator control unit 107 to feed the generator 103 with the excitation current required for the generators 103 to reach a desired generated voltage value, which ensures a balanced system.

According to one aspect of the present disclosure, the generators 103 are electrically connected in parallel with each other. Thus, the system 100 only requires a single set of power feeder wires 105 for supplying electric power to the power distribution center 106. With that, the system 100 reduces the weight of traditional systems.

Besides, the system 100 provides a single generator control unit 107 adapted to perform a voltage regulation loop where all generators 103 of the system are taking into account. This way, the system 100 reduces even more the weight of traditional systems, and at the same time simplifies the system. To operate the voltage regulation loop, the generator control unit 107 is electrically coupled with either each one of the electric power generators 103 to individually feed them 103 with an excitation field current and with the neutral current transformer 104 of each generator 103 to sense the instantaneous neutral-current value of each generator 3. These couplings allow the generator control unit 107 to control and regulate the power generated by each generator 103 of the system. Modifying the excitation field current value directly affects the generated voltage, and the instantaneous neutral-current value is indicative of how much is balanced the power generated by the generator 3.

For the regulation, the generator control unit 107 is adapted to individually modify the excitation field current of each generator 103 based on a desired voltage value and the two sensed instantaneous neutral-current values of the two generators 103. The system 100 ensures that generators 103 generate substantially the same voltage by providing the excitation field current required by each generator 103 to produce the desired voltage value.

Figure 3:
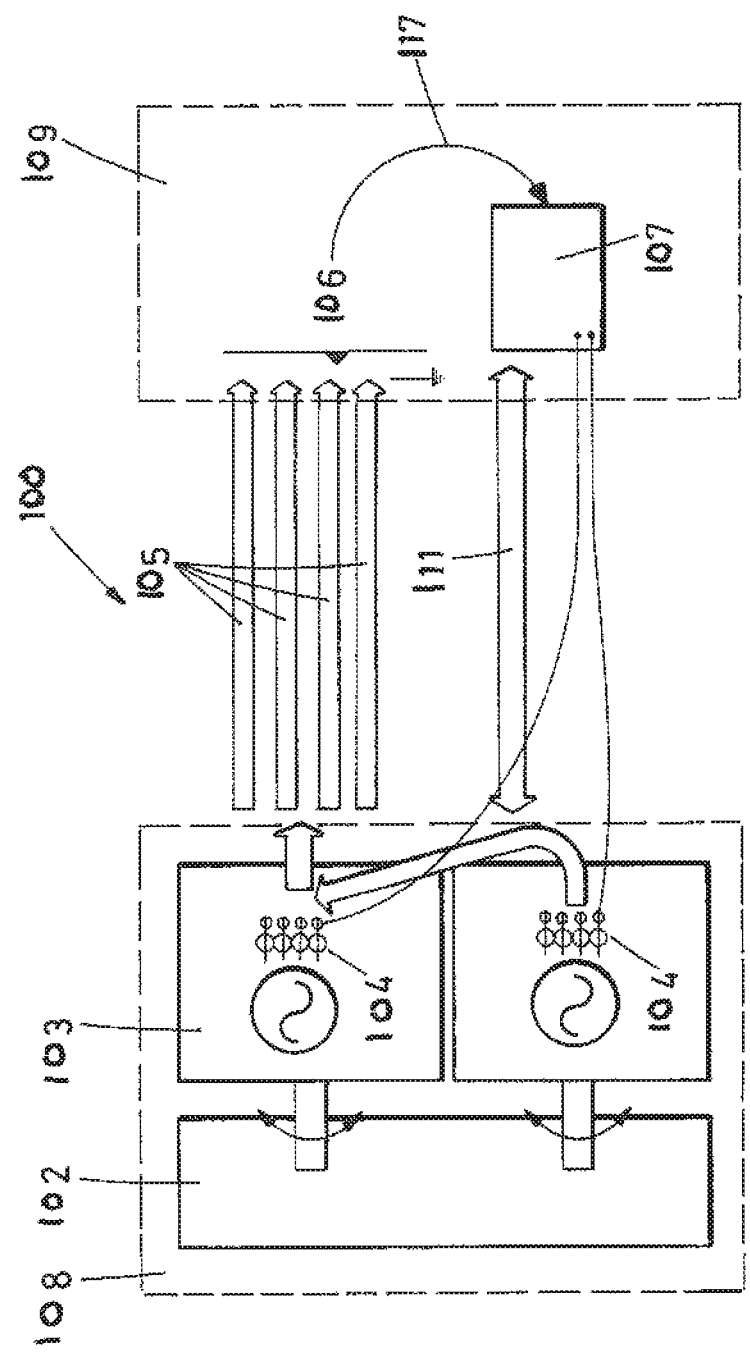
FIG. 3 is a schematic side view of an electric power distribution system in accordance with an aspect of the present disclosure.

Preferentially, as shown in FIGS. 2 and 3, the generator control unit 107 is connected with the power distribution center 106 by a dedicated link 117. While in the prior art, generators 3 supply electric power to the distribution center 6 individually, in the system 100 of the present disclosure generators supplies the power simultaneously. Thus, only one dedicated link 117 is required.

Through the dedicated link 117, the generator control unit 107 receives and monitors the voltage generated by generators 103. The generator control unit 107 is adapted to compare this measured voltage with the desired voltage value (typically, around 235 Vac on newer aircrafts) for performing the regulation loop.

According to an aspect of the present disclosure, the generator control unit 107 is adapted to provide a voltage synchronized regulation loop by determining an unbalance condition between generators 103 by obtaining the root mean square value of the instantaneous neutral-current difference between the two or more generators 103. If an unbalanced condition is determined, the generator control unit 107 is further adapted to calculate the relative power factor from the instantaneous neutral-current difference and the desired voltage value to identify the unbalanced generator 103, and the excitation field current of the unbalanced generator 103 is modified until a balanced condition is reached.

In a preferred aspect, the generator control unit 107 is configured to determine an unbalance condition between generators 103 when the root mean square value of the instantaneous neutral-current difference between the two or more generators 103 is different from zero.

Further, once an unbalance condition between generators 103 is determined, an additional input condition is needed to identify which generator in under/overexcited with respect to the other. For that, the generator control unit 107 is configured to calculate the relative power factor from the instantaneous neutral-current difference between both generators 103 and the measured POR (Point Of Regulation) voltage value and to modify the excitation field current of the unbalanced generator 103 until a balanced condition is reached.

In one aspect, the generator control unit 107 is configured to increase the excitation current of the unbalanced generator 103 when a relative power factor is a negative value, and to decrease the excitation current of the unbalanced generator 7 when the relative power factor is a positive value.

To achieve the operability of an electric power distribution system with a parallel generators installation, apart from voltage, frequency and phase of the generators have to be synchronized.

For that, according to another preferred aspect of the present disclosure, the APU gearbox 102 is adapted for driving the at least two generators 3 at the same speed to provide a frequency synchronized system 100.

Figure 4:
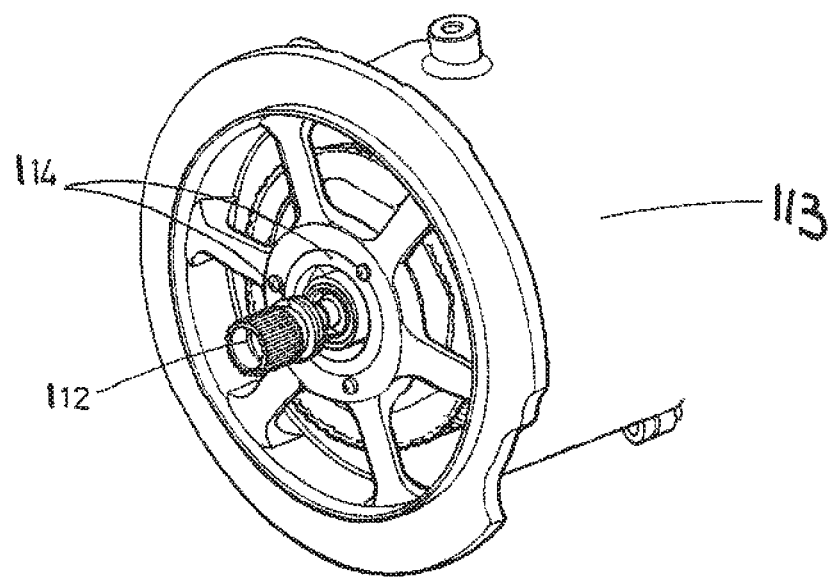
FIG. 4 is a schematic perspective view of a generator with a housing and a rotor driveshaft that is driven by the engine gearbox, where both the housing and the rotor driveshaft have color marks to ensure phase synchronized generators installation, in accordance with an aspect of the present disclosure.
Figure 5:
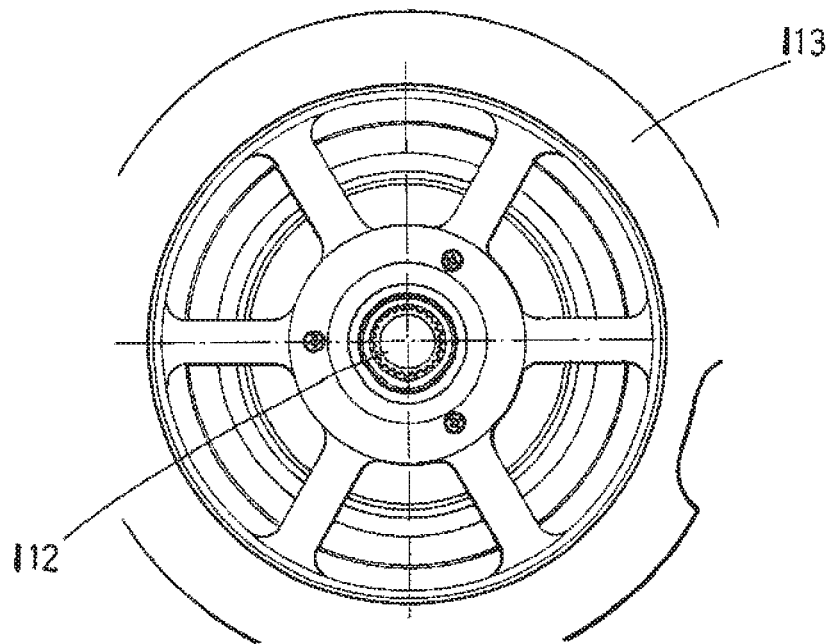
FIG. 5 is a schematic front view of the generator housing and rotor driveshaft shown in FIG. 4, where the generator housing and the engine gearbox are configured to match for providing a phase synchronized generators, in accordance with an aspect of the present disclosure.

In an aspect, as shown in FIGS. 4 and 5, the generator 103 includes one rotor driveshaft 112 driven by the engine gearbox 102 and a housing 113 adapted to receive the rotor driveshaft 112.

As shown in FIG. 4, in order to provide a phase synchronized generators, the generator housing 113 and the rotor driveshaft 112 can be provided with a color mark 114 to ensure generators 103 are mounted in phase to each other.

As shown in FIG. 5, according to another preferred aspect, the engine gearbox 102 and the rotor driveshaft 112 of the generator can be both configured to match one another to provide a phase synchronized generators. Preferably, the generator rotor driveshaft 112 includes splines and the engine gearbox 102 which has a serrated shaped. Additionally, both have a specific unequivocal matching shape allowing a foolproof insertion that respects the angular position of the rotor to ensure the phase synchronization.

According to another preferred aspect, generators 103 include internal permanent magnet generators (PMG), and the generator control unit 107 is electrically coupled with each one of the generators 103. In this aspect, the generator control unit 107 can monitor the PMG to instantaneously detect the phase and frequency of each generator 103. Also, the generator control unit 107 can be further configured to disconnect the system 100 and trigger a synchronization fault signal if the relative phases and frequencies of the generators 103 surpass tolerance thresholds.

Figure 1:
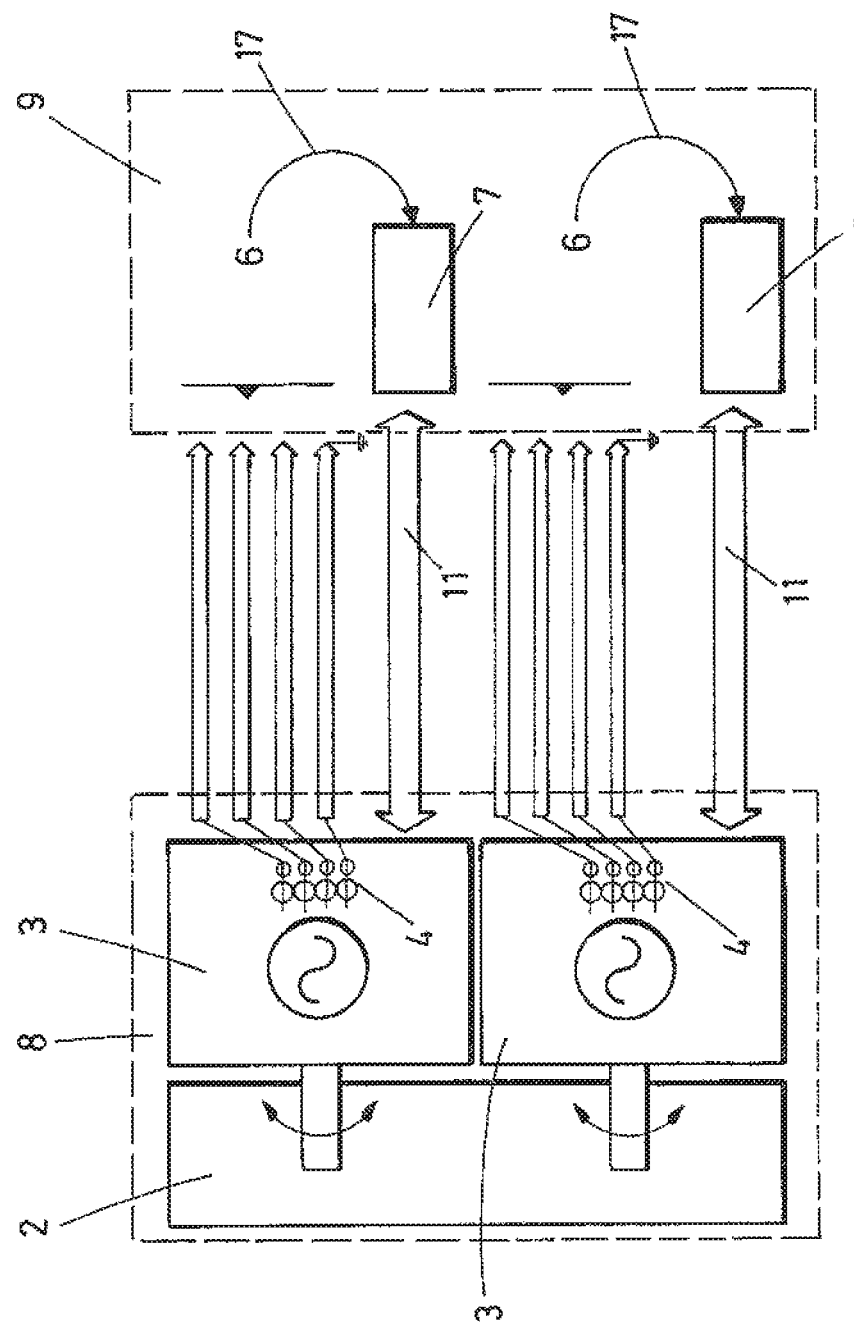
FIG. 1 is a schematic view of a conventional electric power distribution system of an aircraft in accordance with the prior art, in which each electric power generator of an auxiliary power unit is linked to the power distribution center of the aircraft by a set of power feeder wires.

As shown in FIG. 1, in conventional electric power distribution systems, each generator control unit 7 is electrically coupled with each one of the generators 3 by a dedicated PMG link 11. However, according to the system 100 of the present disclosure and as shown in FIGS. 2 and 3, the PMG links 111 can be coupled to the single dedicated generator control unit 107.

FIG. 2 shows a first example of the system 100. According to an aspect of the system 100 of FIG. 2, the system 100 further includes a terminal block 110 adapted for receiving power output wires 112 of each generator 103 and outputting the set of power feeder wires 105 through which generators 103 supply electric power to the power distribution center 106.

FIG. 3 shows a second example of the system 100. According to an aspect of the system 100 of FIG. 3, the generators 103 have power output wires 112, which are connected together at the entrance of the single set of power feeder wires 105. As a result, the example, shown in FIG. 3, is lighter than the example shown in FIG. 2.

In another aspect, the generators of the system 100 have a three-phase four-wire structure.

According to a preferred aspect, the power distribution center 106 is located at an aircraft nose section 109, and wherein the engine gearbox 102 and the three-phase synchronous electric power generators 103 are housed at the aircraft tail cone 108. In this case, the engine gearbox refers to an APU gearbox, so that the system 100 reduces the number of wires crossing the whole length of the aircraft. At the same time, the system 100 reduces the associated weight, costs, and space required by traditional systems.

Additionally, in another preferred aspect, the power distribution center 106 is located at an aircraft nose section 109, and the engine gearbox 102 and the three-phase synchronous electric power generators 103 are housed at the central section (between the nose and the tail section) of the aircraft. In this case, the engine gearbox 102 could be a main engine gearbox, and as such, the system 100 would also reduce the number of wires crossing the aircraft.

The electric power distribution system 100 described in the two last examples also include a terminal block 10, as shown in FIG. 2. The terminal block 10 is preferably housed close to the engine to maximize the weight saving.

Finally, according to another aspect of the present disclosure, the system further includes an aircraft (not shown) including the electric power distribution system 100 as described above.

With respect to existing electrical network architectures, the electric power distribution system of the system 100 presents the various advantages. For instance, the system 100 may provide for aircraft harness weight savings, aircraft installation simplification, and recurrent cost reduction, since only four feeder (three phases+neutral) are needed to link the parallel generators with the power distribution center compared with the at least eight feeder conventionally used. Additionally, the system 100 may also provide for equipment weight and recurrent cost reduction, since only a single generator control unit can be used to control and regulate the parallel generators and the aircraft power distribution center would see them as a single one (simplified power management).

With respect to new electrical network architectures, the electric power distribution system of the system 100 presents the various advantages. For instance, the system 100 may allow for modularity, and new developments nonrecurrent cost reduction, since the system of the invention allows scaling up the power generation capabilities of a more electrical aircraft without the need to design new bigger electrical generators. Additionally, the system 100 of the present disclosure avoids redesigning the aircraft power distribution when an aircraft evolution requires passing from a single-engine generator to a dual-engine generator in order to cope with increased power needs, since the aircraft power distribution center would see the parallel generators as a single one. Further, in case of electric power generators 103 components failure, the system could work in a degraded mode (reduced maximum power) excluding the faulty generator by means of isolation contactors.

What is claimed:

1. An electric power distribution system for an aircraft, the electric power distribution system comprising:

an engine gearbox and a power distribution center;
at least two three-phase synchronous electric power generators adapted to be driven by the engine gearbox and to supply electric power to the distribution center, the at least two generators being electrically connected in parallel with one another and each power generator including an internal permanent magnet generator;
at least two neutral current transformers, wherein each of said at least two neutral current transformers are connected to one of the electric power generators;
a set of power feeder wires electrically connected to the at least two generators and the power distribution center for simultaneously supplying electric power from the at least two generators to the power distribution center, and
a single generator control unit electrically coupled to both of the at least two generators to individually feed the generators with an excitation field current and a single link connecting the internal permanent magnet generators of each electrical power generator to the single generator control unit,
wherein the generator control unit is electrically coupled with the neutral current transformer of each one of the at least two generators, wherein the single generator control unit is adapted for sensing an instantaneous neutral-current value of each of the at least two generators, and wherein the generator control unit is adapted to perform a generator voltage regulation loop based on a desired voltage value and the sensed instantaneous neutral-current values of the at least two generators, by individually modifying the excitation field current for each of the at least two generators, to ensure that the at least two generators are balanced by generating substantially the same voltage, and wherein said generator control unit is connected to said power distribution center by a single dedicated link and wherein said power distribution center supplies electrical power from said generators to said system, and
wherein the single generator control unit is adapted to monitor each internal permanent magnet generator to continuously and instantaneously detect the phase and frequency of each electrical power generator and wherein the generator control unit is configured to disconnect the electrical power distribution system and generate a synchronization fault signal if the relative phases and frequencies of the electrical power generators surpass preset tolerance thresholds.

2. The electric power distribution system of claim 1, wherein the generator control unit is adapted to provide a voltage synchronized regulation loop, wherein the voltage synchronized regulation loop determines an unbalance condition between the at least two generators by obtaining the root mean square value of the instantaneous neutral-current difference between the at least two generators, and wherein when the unbalanced condition is determined, the generator control unit is adapted to calculate the relative power factor from the instantaneous neutral-current difference and the desired voltage value to identify the unbalanced generator and modify the excitation field current of the unbalanced generator until a balanced condition is reached.

3. The electric power distribution system of claim 2, wherein the generator control unit is configured to determine an unbalance condition between generators when the root mean square value of the instantaneous neutral-current difference between the at least two generators is different from zero.

4. The electric power distribution system of claim 2, wherein the generator control unit is configured to increase the excitation current of the unbalanced generator when the relative neutral power factor is a negative value, and to decrease the excitation current of the unbalanced generator when the neutral relative power factor is a positive value.

5. The electric power distribution system of claim 1, wherein the engine gearbox is adapted for driving the at least two generators at the same speed to provide a frequency synchronized system.

6. The electric power distribution system of claim 1, wherein each of the at least two generators include at least one rotor driveshaft configured for being driven by the engine gearbox, wherein each of the at least two generators have a housing adapted to receive the rotor driveshaft, and wherein each housing and the rotor driveshaft have a color mark to ensure the generators are mounted in phase to each other.

7. The electric power distribution system of claim 1, wherein the at least two generators includes a rotor driveshaft configured for being driven by the engine gearbox, and wherein the engine gearbox and the generator rotor driveshaft are configured to match one another for providing phase synchronized generators.

8. The electric power distribution system of claim 1, wherein the at least two generators have a plurality of power output wires, and wherein the plurality of power output wires of each of the generators are connected together at the entrance of the single set of power feeder wires.

9. The electric power distribution system of claim 8, further comprising:
a terminal block adapted for receiving the plurality power output wires of each of the at least two generators and for outputting the set of power feeder wires through which the at least two generators supply electric power to the power distribution center.

10. The electric power distribution system of claim 8, wherein the at least two generators have a three-phase four-wire structure.

11. The electric power distribution system of claim 1, wherein the power distribution center is located at an aircraft nose section, and wherein the engine gearbox and the at least two generators are housed at the aircraft tail cone.

12. The electric power distribution system of claim 9, wherein the terminal block is housed at the aircraft tail cone.

13. An aircraft, comprising:
an electric power distribution system having,
an engine gearbox and a power distribution center;
at least two three-phase synchronous electric power generators adapted to be driven by the engine gearbox and to supply electric power to the distribution center, the at least two three-phrase synchronous electric power generators being electrically connected in parallel with one another and each power generator including an internal permanent magnet generator;
at least two neutral current transformers, wherein each of said at least two neutral current transformers are connected to one of the electric power generators;
a set of power feeder wires electrically connected to the at least two electric power generators and the power distribution center for simultaneously supplying electric power from the electric power generators to the power distribution center, and
a single generator control unit electrically coupled to both of the electric power generators to individually feed each one of the generators with an excitation field current and a single link connecting the internal permanent magnet generators of each electrical power generator to the single generator control unit, wherein the generator control unit is electrically coupled with the neutral current transformer of each one of the generators, wherein the generator control unit is adapted for sensing an instantaneous neutral-current value of each generator, and wherein the generator control unit is adapted to perform a generator voltage regulation loop based on a desired voltage value and the sensed instantaneous neutral-current values of the at least two generators, by individually modifying the excitation field current of each generator, to ensure that both generators are balanced generating substantially the same voltage, and wherein said generator control unit is connected to said power distribution center by a single dedicated link and wherein said power distribution center supplies electrical power from said generators to said system, and wherein the single generator control unit is adapted to monitor each internal permanent magnet generator to continuously and instantaneously detect the phase and frequency of each electrical power generator and wherein the generator control unit is configured to disconnect the electrical power distribution system and generate a synchronization fault signal if the relative phases and frequencies of the electrical power generators surpass preset tolerance thresholds.

* * * * *